Patented July 10, 1934

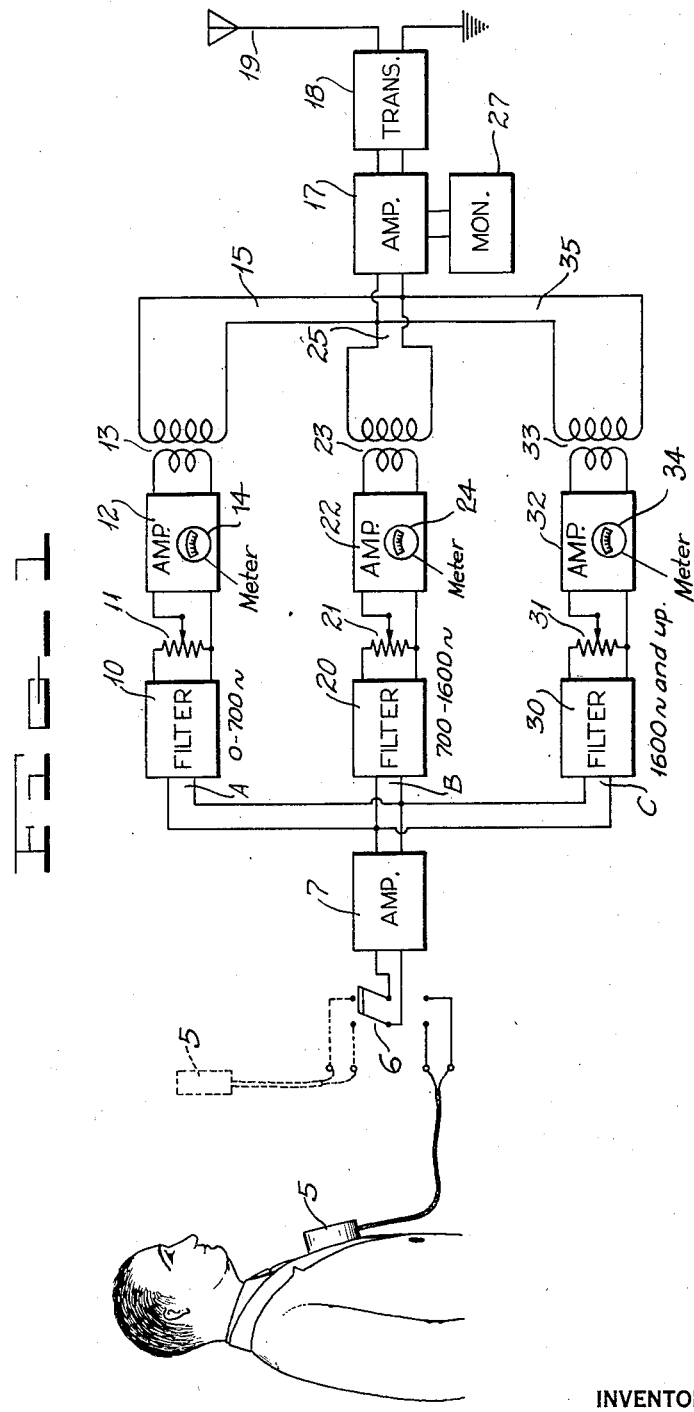

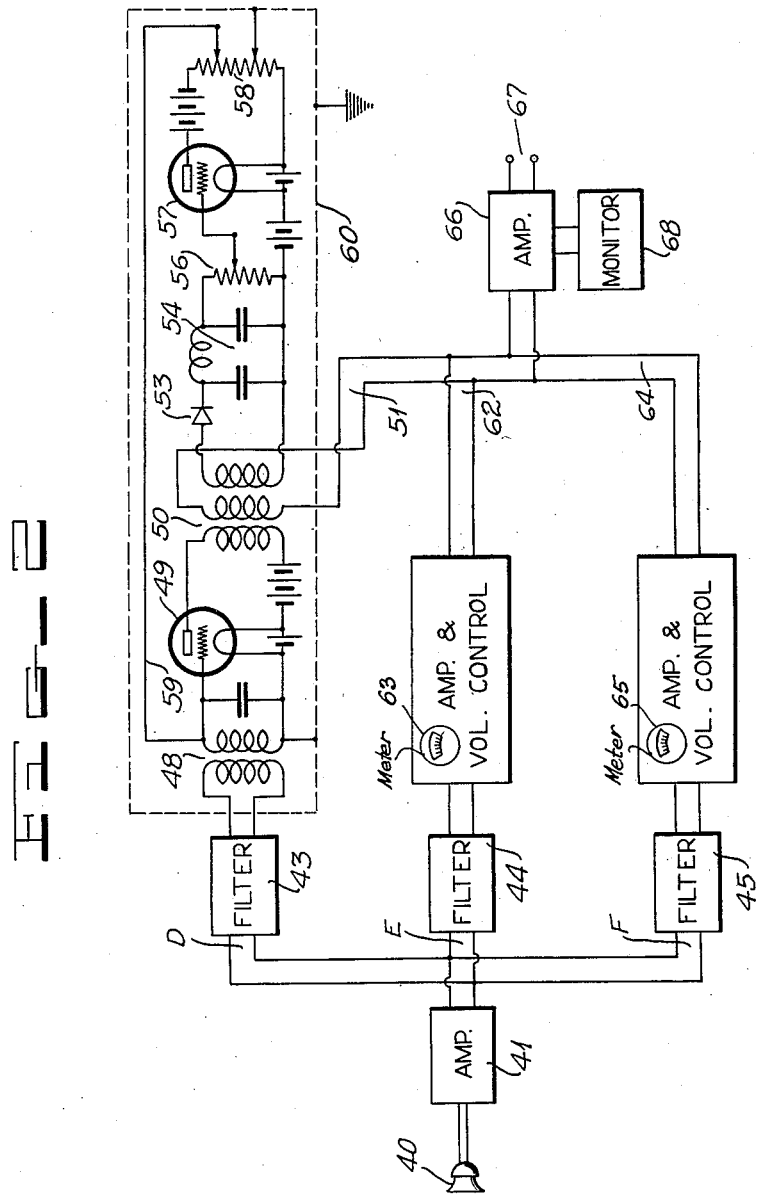

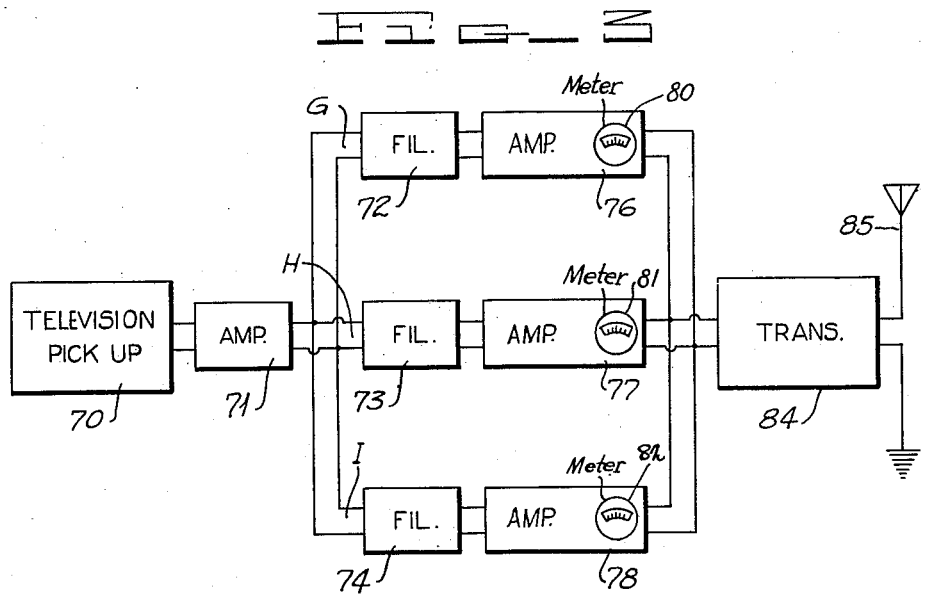
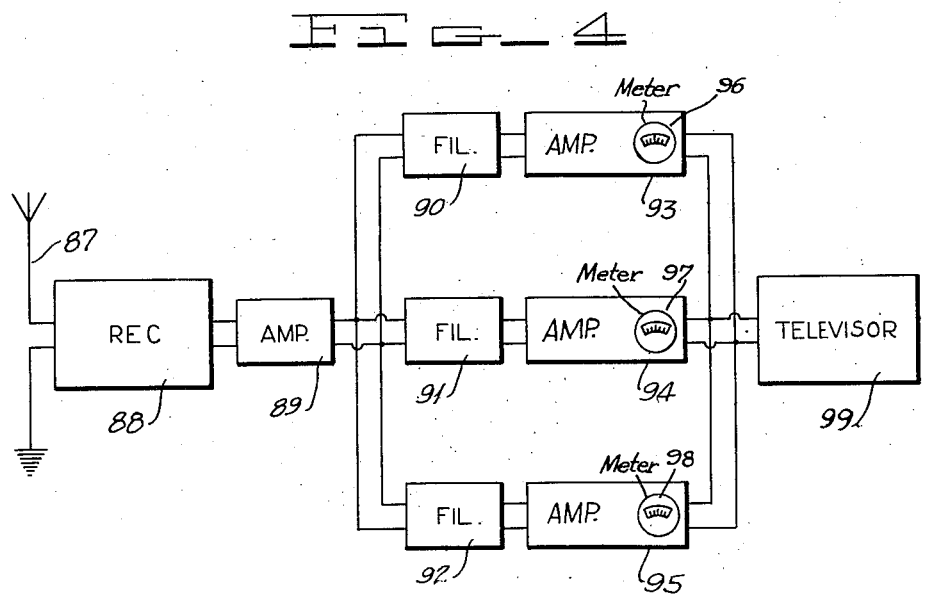

1,965,720

UNITED STATES PATENT OFFICE 1,965,720

ELECTRICAL DISTRIBUTION SYSTEM

Alexander McLean Nicolson, New York, N. Y., assignor to Communication Patents, Inc., New York, N. Y., a corporation of Delaware Application May 14, 1931, Serial No. 537,274

9 Claims. (Cl. 179—1)

This invention relates to transmission systems for electrical signals and particularly to systems for distortionless transmission and reproduction of sound and visual signals.

It is necessary in the transmission of electrical currents to employ certain transmission elements such as transformers, condensers and inductances which have the intrinsic property of changing the relationship between the voltage and current of a signal passing therethrough, so that a different wave form exists at the output terminals of the element from that impressed at the input terminals. These individual elements acting in conjunction with others, form filters or tuned circuits resonant to certain frequencies which may lie within the transmission band, and consequently have a deleterious effect upon the wave shape of the transmitted signals. Where currents of many frequencies compose a certain signal, these elements vary the proportionality between the frequency components, thereby distorting the signal wave.

The principal object of the present invention is to transmit electrical signals from their point of initiation to their point of reproduction with fidelity of wave form.

Another object of the invention is to amplify electrical signals with fidelity of wave form.

A further object of the invention is to restore the proper wave form of electrical signals by correcting for any distortion arising at the source or during transmission from the detecting device to the reproducing device.

A still further object of the invention is to transmit a wide band of frequencies from one point to another without loss or attenuation of any of the frequencies in the band.

The method of operation, in brief, is dividing a non-distorted signal into component parts at the source of initiation, noting the characteristic of each part and producing these characteristics at the reproducer in the event that one or more of the components have suffered a change at the source or during transmission. If all portions of a signal may be received at the reproducing device, not only at their proper volume level, but in the proper relationship to one another, then the combination of the component parts will create the original signal.

It is well known that where sound is detected, amplified and distributed around an auditorium or outdoor space by electrical transmission, it is difficult to maintain the source of sound at the proper position with respect to the detecting device which is usually a microphone. For instance, when a public speaker is the source of signals, his movements or gestures upon the platform vary his position with respect to the microphone. Similarly, but more pronounced is the case of speakers demonstrating their statements at a blackboard or with projection slides, and who use a microphone attached to their person in order to permit them sufficient freedom to move about. In these cases there is considerable distortion created by these movements as well as a fixed distortion caused by positioning the microphone on the person.

It well known, as illustrated in table IV on page 59 of "Speech and Hearing, by Fletcher", that when a person enunciates, the sound waves created are composed of frequencies generated by various parts of the body. That is, certain sounds contain frequencies which are caused by characteristics of the throat, nose and mouth. It is also known that very low frequencies are created by vibrations of the chest and back, and that extremely high frequencies are frequently generated from the boney structure of the head. It is obvious, therefore, that should a microphone be positioned on the chest of a speaker, the low frequencies generated by the chest will dominate frequencies generated by the others, producing an unnatural effect. The present invention corrects for such distortions, as will be explained hereinafter.

This invention is also useful when a stationary microphone is employed and the actor changes his position during delivery. At the time when the speaker's voice is directed to one side of the detecting device, a certain distortion occurs caused by the varying rates of attenuation at the different frequencies. Further, the invention is adaptable to systems in which a wide band of frequencies is to be simultaneously transmitted from one point to another, such as in the transmission of picture elements at a rate within the persistency of vision to create the effect of motion. In such systems the frequency band is much wider than that required for high quality sound transmission, and the present invention is adaptable to obtain at the televisor the original wave form by restoring any depleted portions caused by transmission elements. Therefore, by sub-dividing the original wave into components, each of which has a normal energy level, and producing this level at the reproducer regardless of the value of the received signal while maintaining the proper proportionality between components, the signal will be reproduced in its natural form. This control may be either manual or automatic.

The invention will be more fully understood by reference to the following description in conjunction with the accompanying drawings, in which:

Figure 1 shows the invention adapted to a public address or transmission system in which the speaker carries the detecting device about on his person.

Fig. 2 is a schematic drawing of an embodiment in which automatic control of the volume level in the channels is employed; and Figs. 3 and 4 are diagrammatic drawings of a transmission and receiving system for television signals.

Referring specifically to Fig. 1, a source of electrical signals is a microphone 5 shown positioned on the chest of a speaker. The output of the microphone is connected through a double pole, double throw switch 6 to an amplifier 7. The output signal in the amplifier is divided into three channels A, B and C, each of which includes similar apparatus. The channel A comprises a filter 10, volume adjusting potentiometer 11, amplifier 12, transformer 13, meter 14, and an output circuit 15. The channel B comprises a filter 20, volume adjusting potentiometer 21, amplifier 22, transformer 23, meter 24 and an output circuit 25. The channel C comprises a filter 30, volume adjustment potentiometer 31, amplifier 32, transformer 33, meter 34, and an output circuit 35. The three output circuits are fed in parallel into an amplifier 17, which in turn feeds transmitting equipment 18 for broadcasting over the antenna 19. A monitor circuit 27 may comprise solely a sound reproducing device or said device together with an associate amplifier. It is to be understood that the transmitting apparatus may be replaced by additional amplifiers to distribute the signals to loud speakers located around an auditorium or in an outdoor space. Such public address systems are well known in the art. The microphone 5 has been shown in a dotted position directly in front of the speaker with a connection to the amplifier 7 through the switch 6. The switch is not necessary, however, when using the same microphone, but it may be preferable at times to use a second microphone, and in that case, the switch is convenient.

The three channels A, B and C differ by having filters of different characteristics, that is, the filter 10 in this particular embodiment passes frequencies lying below 700 cycles. The filter 20 is of the band pass type well known in the art, and passes frequencies lying between 700 and 1600 cycles, while the filter 30 transmits frequencies from 1600 cycles upward. The arrangement of these filters may be altered in accordance with the frequencies within the particular frequency source, and the character of the initiating elements creating the various frequencies in the signal. For instance, should there be natural lines of division between frequency bands, so that several or more sub-sources create distinctive bands to obtain the whole signal wave, then the filters will be constructed to serve that particular source of signal frequencies. In this particular instance the frequencies have been chosen in accordance with Table 4 in Dr. Fletcher's book, while in the case of other sources of signals it may be desirable to make a different division of the signal frequencies. It is to be understood that though only three channels have been shown in this particular embodiment of the invention, more divisions of the signal may be made without departing from the spirit of the invention.

The operation of the system in Fig. 1 is as follows: The microphone 5 is first placed a distance in front of the speaker as illustrated by the dotted lines, so as to obtain optimum reproduction at the monitor 27. During this adjustment, the potentiometers 11, 21 and 31 are set at positions so that the amplification in each channel is the same. When the best reproduction is obtained at the monitor, the meters 14, 24 and 34 register a certain energy level which indicates the energy within the frequency band passing through that particular channel. These measurements are noted. The microphone is then placed in the position to be used by the person whose voice is to be reproduced. A test is again made with the person speaking and the meter readings are again noted. Any variations from the former readings in the respective meters is remedied by adjustments of the potentiometers 11, 21 and 31. The adjustments may be such that it is necessary for the gain in channel A to be reduced while an increase is justified in channels B and C, caused by the efficient pick-up of the lower frequencies. After these adjustments are made, the system will reproduce the voice of the speaker with the same naturalness as though the microphone was directly in front of him in its normal position.

Referring to Fig. 2, a similar division of the sound channel is made, the difference between the systems being in the automatic volume control circuit in each channel. The microphone 40 may be positioned in the neighborhood of the sound signals to be detected, preferably, directly in front of a singer or speaker. The output of this microphone is connected to an amplifier 41 which has its output circuit divided into three channels D, E and F, with respective filters 43, 44 and 45. In case of music to be detected by the microphone 40, these filters may be arranged for division as follows: filter 43 passing all frequencies up to 1000 cycles; filter 44 passing from 1000 to 2500 cycles; filter 45 passing 2500 cycles and up. For ordinary speech division, the filters may have cut-offs as shown in Fig. 1. A schematic arrangement of the automatic volume control is shown in channel D while this circuit in the other channels is illustrated by labelled diagrams.

Referring to the volume control circuit, the output of filter 43 is transmitted through the coupling transformer 48 to a vacuum tube amplifier 49. The output of amplifier 49 is transmitted through a three winding transformer 50 to an output circuit 51, as well as to a rectifier 53 and smoothing circuit 54. A manual adjustment of volume is obtained by a potentiometer 56 connected to a vacuum tube 57. This vacuum tube is the volume control tube, and has in its output circuit a potentiometer resistance 58 and a tapped conductor 59 connected to the grid of the amplifier 49. The return circuit is by way of the metallic shield 60. By controlling the amount of current flowing in the plate circuit of tube 57, the bias upon the amplifier 49 is determined.

The operation of this automatic volume control is as follows: As the signal increases in the amplifier 49, the bias is proportionally increased through rectification of the signal at 53. The rectified signal produces an increase in the plate current through the tube 57 and an increased voltage drop across the resistance 58 which is impressed on the tube 49. At lower input levels, the bias on the tube 49 is decreased, permitting an increased gain to be obtained in the amplifier.

The channel E has a similar control circuit with an output circuit 62, this channel showing a meter 63 a similar meter being present in channel D, but not shown. Similarly the channel F has an amplifier and automatic volume control system with its output circuit 64 and meter 65. The output circuits 51, 62, and 64 are combined in parallel and impressed upon an amplifier 66 with a monitoring circuit 68. The amplifier 66 has output terminals 67 which may feed broadcasting transmission equipment or a wired carrier system, or may be led to a plurality of loud speakers distributed around an auditorium in a manner common to public address system practice.

The system of Fig. 2 is especially well adapted for public address work or radio broadcasting a group of speakers acting in a play, wherein it is practically impossible to present each speaker before a microphone in the optimum position. Before the system is ready to operate, it is adjusted by obtaining in the monitor circuit 68 which may be simply a loud speaker or ear phones, the best quality reproduction obtainable when the speaker is at the proper distance directly in front of the microphone. During this adjustment the potentiometers 56 in the respective channels are adjusted to obtain normal amplification of the frequency bands when the signal input is normal. When this condition obtains the transmission through the various channels will remain at that level no matter what the volume input for any one of the frequency sub-bands.

For instance, should the channel E receive a lower energy level caused by the speaker being at right angles to the microphone 40, then the amplification in this channel is increased to maintain the proper proportionality between the components to produce the same quality as though the speaker was directly in front of the microphone. Any difficulty of the audience to hear the speaker and interpret the words will be eliminated when the speaker turns to gesture or to face different portions of the audience. This transmission circuit automatically takes care of any reduction of the components in the frequency band impinging on the diaphragm of the microphone 40, so that the reproduced tone is natural.

Referring to the diagrammatic system in Fig. 3, television pick-up apparatus 70 of any well known type has its output circuit divided into three channels G, H, I, including filters 72, 73 and 74, respectively. The outputs of these filters are fed into respective amplifiers 76, 77 and 78 with respective meters 80, 81 and 82. The outputs of the amplifiers 76, 77 and 78 are combined and impressed upon the transmitter 84 for transmission over an antenna system 85. The antenna system may be replaced by a wire circuit well known in wire carrier systems. The three channels may be controlled manually as shown in Fig. 1, or by an automatic volume control circuit such as shown in Fig. 2, but in this system the requirements at the transmitter is only a question of individually monitoring the sub-bands as received directly from the television pick-up apparatus. That is, after the frequency band is divided into the desired number of channels dependent upon the range of the band, it is sufficient to note the level of each sub-band and make this information available to the operator at the receiver. This may be accomplished in any suitable manner. Because of the general constant character of television signals after normal operation is obtained, periodic readings are only necessary.

Referring to the receiving system in Fig. 4, an antenna 87 impresses the received signal on receiver 88 which, after amplification at 89, is divided into the same frequency sub-bands as in Fig. 1, by filters 90, 91 and 92, respectively. After division in these filters, the sub-bands are amplified in amplifiers 93, 94, 95, and the amplitudes of the outputs noted on respective meters 96, 97 and 98. The outputs of the amplifiers are combined and impressed on the televisor 99 of any suitable type, such as a disk or arc screen. The operator at the receiving station, having knowledge of the proper volume levels of each of the channels, varies the amplification in the amplifiers as required. In the case of automatic control, the proper initial adjustment is made manually and thereafter the circuit is self-adjusting. Therefore, in case of a greater attenuation of some frequency sub-bands through the transmission apparatus intermediate the respective channel amplifiers, this loss is compensated for at the receiving amplifiers. By increasing the number of frequency channels, distortionless transmission of signals including a wide band of frequencies is approached. Phase shifters with manual controls may be inserted intermediate the filters and amplifiers at the receiving stations, so that adjustments may be made to correct for undesirable phase shifts in the transmission apparatus.

Although the invention has been described in its preferred embodiments, other uses will occur to those skilled in the art, and the invention is to be limited only by the scope of the appended claims.

What is claimed is:

1. In combination, means for transforming sound waves into corresponding electrical currents with corresponding frequencies, means for segregating certain of said frequencies into a plurality of substantially mutually exclusive sub-bands, means for determining the normal volume level of each of said sub-bands, a plurality of amplifiers for amplifying each of said sub-bands independently, means for combining the output of said amplifiers and means for adjusting the amplification of said amplifiers to maintain the normal volume level during increases and decreases in the initial volume level of any of said sub-bands.

2. In an electrical amplifying system, the combination of means for transforming sound waves from a plurality of sources into corresponding electrical frequencies, means for segregating discrete frequencies in accordance with the characteristic of said sources into individual channels, means for separately amplifying the currents in said individual channels, means for determining the energy level of the signal in each channel and means for adjusting the amplification in each channel to maintain the output energy level constant during decreases and increases in the original energy level of the said sources.

3. In combination an electrical detector of sound waves the electrical waves therefrom not being proportional in all respects to said sound waves, means for transforming said electrical waves into sound waves, means intermediate said detector and said transforming means for separately amplifying substantially mutually exclusive divisions of said electrical waves in individual channels, means for determining the degree of distortion in said divisions, and adjustable volume controls for restoring the divisions of said waves to the proportions corresponding to the proportion of said sound waves.

4. The method of restoring the wave shape of a signal having distortion therein, comprising analyzing said signal into substantially mutually exclusive sub-frequency bands, and amplifying each of the bands so that they are related to one another in the proper ratios of a normal signal.

5. The method of correcting a distorted signal extending over a band of frequencies comprising dividing said signal into a plurality of sub-bands, obtaining the energy level of each of said sub-bands, and restoring said energy level of each of those of said sub-bands which have been increased or decreased so that said restored level bears the same proportionate relationship to the other levels as in a normal signal.

6. In combination, a transmission circuit comprising an input circuit, means for generating signals in said input circuit, a plurality of branch circuits extending from said input circuit, said branch circuits passing mutually exclusive frequency portions of a signal in said input circuit, an amplifier in each of said branch circuits, means for determining the proportionalities between the volumes in each of said amplifiers, means controlled by the volumes in each of said circuits for adjusting the gain of each of said amplifiers in said branch circuits in accordance with said determined proportionalities, and an output circuit for combining the outputs of each of said amplifiers.

7. In combination, a transmission system comprising an input circuit, means for generating signals in said input circuit, a plurality of branch circuits extending from said input circuit for passing mutually exclusive portions of a signal in said input circuit, an amplifier in each of said branch circuits, means for determining the desired gain in each amplifier, means controlled by the volume level in each of said circuits for maintaining said gain for each of said amplifiers, and an output circuit for combining the outputs of each of said amplifiers.

8. In a transmission system, an input circuit, means for generating signals in said input circuit, a plurality of branch circuits fed from said input circuit with mutually exclusive portions of a signal in said input circuit, means for determining the energy level of each of said mutually exclusive portions, separate amplifiers in each branch circuit, means controlled by the energy level in each of said circuits for adjusting the gain of the amplifiers in each branch circuit, and an output circuit for combining the outputs of said amplifiers.

9. In an electrical amplifying system, the combination of means for transforming sound waves from a plurality of sources into corresponding electrical frequencies, means for segregating in individual channels certain groups of frequencies in accordance with the characteristics of said sources, means for separately transmitting the currents in said individual channels, means for determining the energy level of the signal in each channel, and means for adjusting the transmission level in each channel to maintain the relationship between each individual level the same as in a normal signal.

ALEXANDER McLEAN NICOLSON.